Jan. 14, 1930.  A. FORD  1,743,961
POWER DRIVEN PLOW
Filed Sept. 20, 1928  3 Sheets-Sheet 3
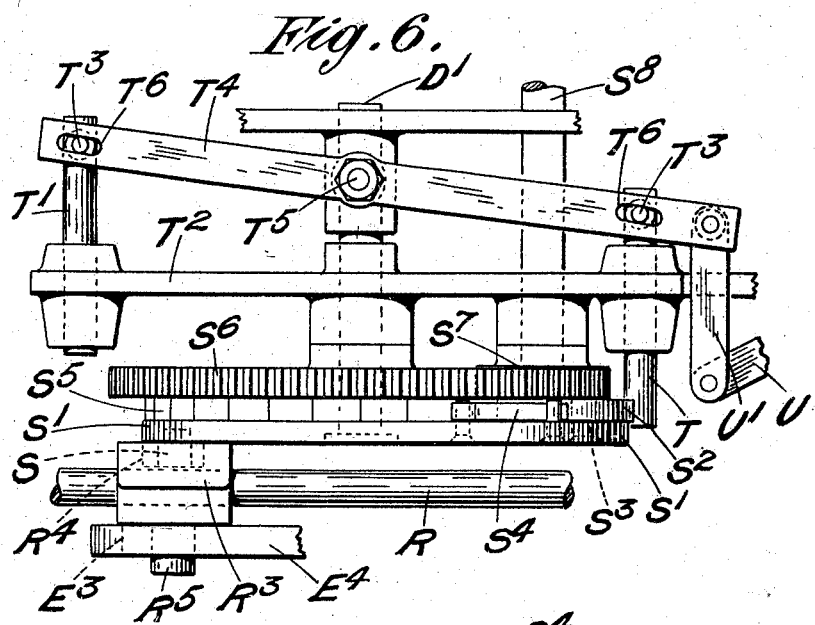
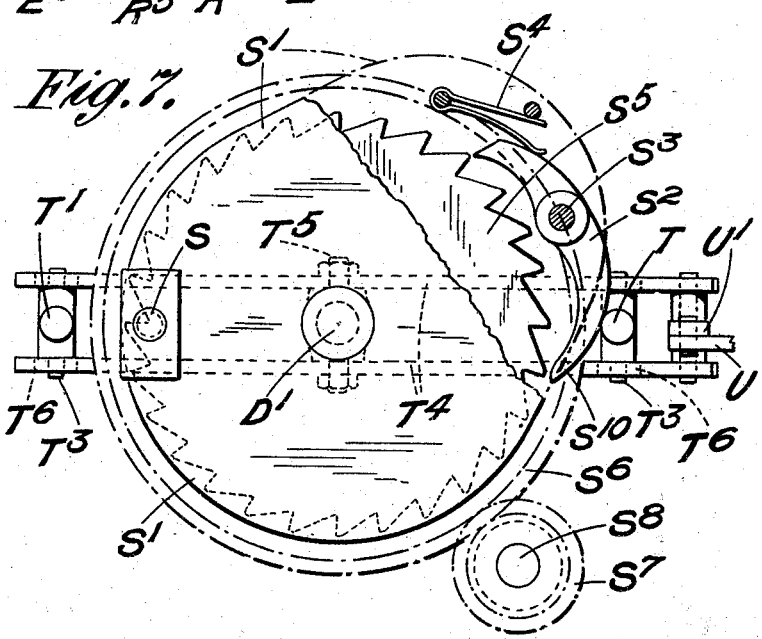

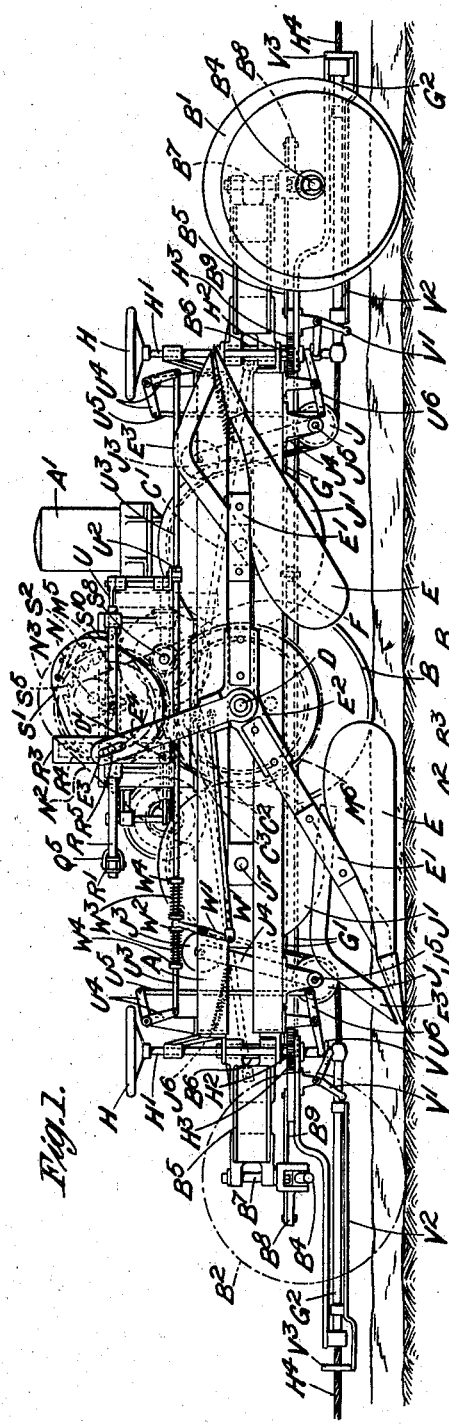

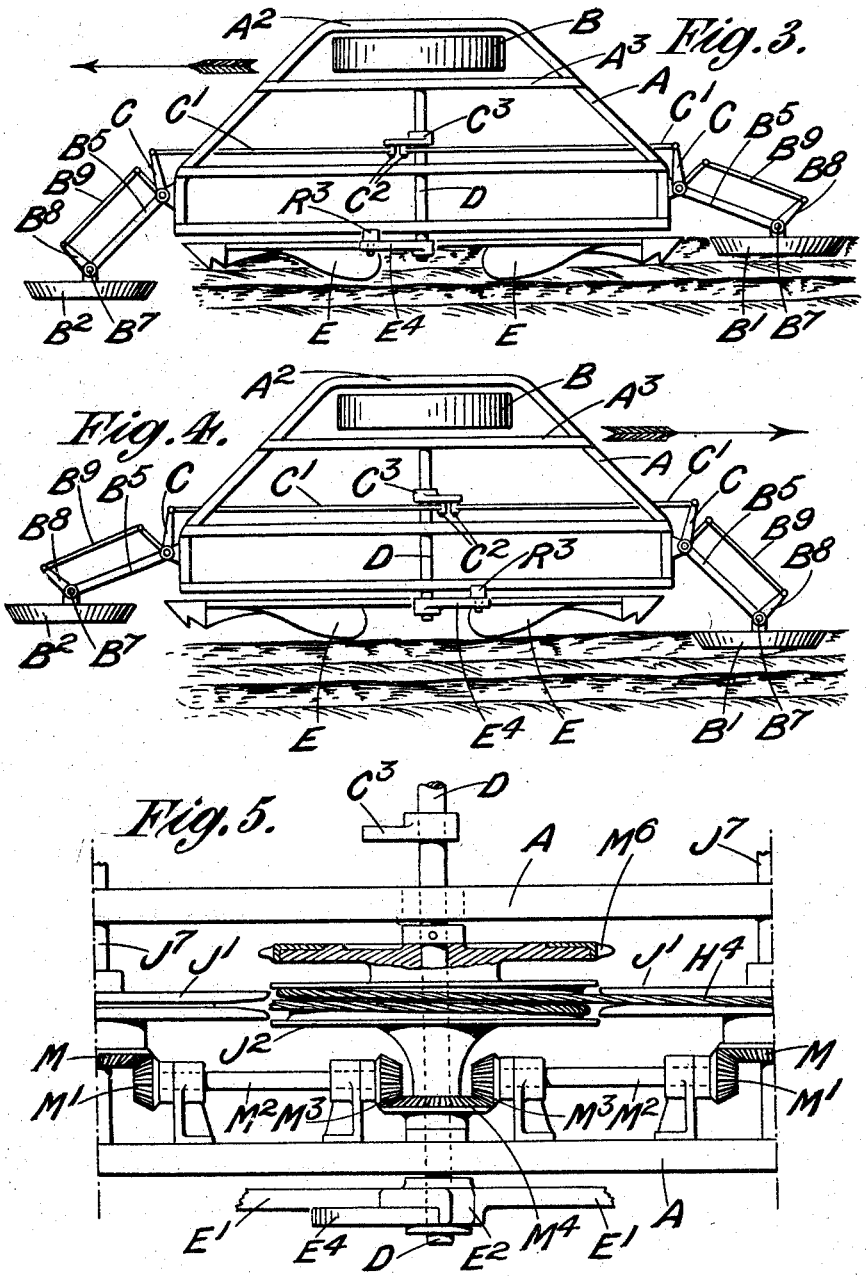

Patented Jan. 14, 1930

1,743,961

UNITED STATES PATENT OFFICE

ARTHUR FORD, OF THORNBY, ENGLAND, ASSIGNOR OF ONE-HALF TO ARNOLD STANCOMB WILLS, OF THORNBY, ENGLAND

POWER-DRIVEN PLOW

Application filed September 20, 1928, Serial No. 307,274, and in Great Britain September 27, 1927.

This invention relates to reversible power driven plows adapted to move backwards and forwards across the land to be plowed and having two plowshares or sets of plowshares adapted to be in operation respectively when the plow is moving in one direction or the other. The object of the invention is to provide a power driven plow of this type having improved set-over mechanism for causing the plow to cut its next furrow or series of furrows which will not only guide the plow into the correct position when it is reversed but will also tend to maintain the distance between succeeding furrows equal and constant throughout their length.

According to the present invention a reversible power driven plow comprises a supporting frame or chassis which carries the plowshares and is supported on the side adjacent to the plowed land by two wheels, and set-over mechanism for effecting relative movement between the frame and both wheels transversely to the direction of travel of the plow in such a manner that the track of the leading wheel is always separated from that in which the following wheel runs by the width of the furrow or series of simultaneously cut furrows.

The number of plowshares adapted to be in operation simultaneously, and hence the number of furrows cut in a single operation, may vary but in any case the following wheel conveniently runs in a furrow actually being cut while the leading wheel runs in a furrow cut on the previous traverse of the plow. Thus, where for example a single furrow only is cut on each traverse of the plow, the following wheel is conveniently arranged to lie directly behind the plowshares so as to run in the furrow being cut thereby, while the leading wheel runs in the furrow last cut.

Thus with a plow according to this invention when the plow is reversed at the end of its travel the wheel which was the following wheel and is now to be the leading wheel is already in the furrow in which it is to run on the return traverse and owing to the transverse movements of the wheels relatively to the frame which are effected on reversing, the preliminary movement of the plow causes the wheel which now becomes the following wheel to move obliquely inwards across the furrow or furrows last cut into a furrow which is actually being cut.

The mechanism for effecting the transverse movements of the leading and following wheels may vary. For example, the axles on which these wheels are mounted may be carried on supports which are adapted to slide transversely of the frame or chassis, Preferably, however, the stub axle of each wheel is carried by the outer end of an arm or lever, the inner end of which is pivoted to the frame so as to be capable of swinging about a vertical axis, a link or other connection being provided between the two arms such that when one wheel moves inwards towards the longitudinal axis of the frame, the other wheel is automatically and simultaneously moved outwards away from such axis. Further, means are preferably provided for simultaneously deflecting the stub axles for steering purposes independently of the transverse movement of the wheels. Thus, for example, each stub axle may be provided with an arm which is connected by means of a link to a lever mounted on a pivot on the plow frame coaxial with that on which the arm carrying the stub axle is mounted. The two levers are operatively connected together through a suitable link or like mechanism so that the stub axles of the two wheels can be caused to turn simultaneously in opposite directions for steering purposes.

The side of the frame adjacent to the unplowed land may be supported on one or more wheels but preferably is supported on a single wheel disposed so as to support the frame approximately midway between its ends. The axle on which this wheel is mounted may be adjustable in height relatively to the frame.

Preferably the leading and following wheels are somewhat dished so as to tend to prevent them mounting the edge of the furrow on to the unplowed land, and if desired means may be provided whereby the extent to which they are dished may be varied. For example the stub axles for these wheels, whether they are deflectable about a vertical axis for steering purposes or not, may be mounted on horizontal pivots and provided with an adjusting lever or arm rigidly secured thereto whereby they can be rocked about such horizontal pivot and locked in the desired angular position.

The set-over mechanism for the leading and following wheels may be operated either by hand or by power derived from the power unit and in the latter case is conveniently adapted to come into operation automatically when the plow reaches the end of its travel in one direction. Further, when the set-over mechanism is adapted to be operated automatically as above described, the means for causing such automatic operation preferably also serve either directly or through further power operated mechanism to reverse the direction of travel of the plow and to effect the necessary movements of the plowshares to bring the desired share or shares into position for plowing in the opposite direction.

The invention may be applied to reversible power operated plows of various types, for example to plows of the kind in which the plow itself is drawn backwards and forwards across the land to be plowed either by cables wound on power driven drums on each side of the land or by an endless cable extending across the land and adapted to be driven by a suitable source of power disposed on one side of the land only, the cable passing round a guide pulley or the like at the other side of the land to be plowed. The invention is, however, more especially applicable to power driven plows of the kind comprising a vehicle carrying its own source of power, such vehicle being caused to travel across the land either by driving one or more of its wheels or by providing one or more power driven pulleys or the like thereon round which is adapted to pass a cable extending across the land and anchored at either end whereby the plow can draw itself across the land by means of the cable. If desired the plow may be constructed so as to operate alternatively either on the anchored cable principle as above described, or by driving one or more of its wheels or both these methods of propulsion may be employed simultaneously.

Where the anchored cable method of propulsion is employed the cable conveniently passes through fair leads on the plow connected to the steering mechanism so that the pull on the cable always tends to cause the plow to travel in a straight line across the land.

The invention may be carried into practice in various ways but one construction of reversing power driven plow according to this invention is illustrated by way of example in the accompanying drawings, in which Figure 1 is a somewhat diagrammatic side elevation, Figure 2 is a plan of the construction shown in Figure 1 with certain parts omitted for the sake of clearness, Figures 3 and 4 are diagrammatic plan views of the supporting frame of the plow showing how the set-over is effected, Figure 5 is a sectional plan of the mechanism whereby the plow is caused to travel, Figure 6 is a plan view of the mechanism for operating the set-over mechanism and for raising and lowering the plowshares, and Figure 7 is a side elevation of the mechanism shown in Figure 6 partly broken away.

In the construction illustrated the plow comprises a frame or chassis A of the form shown carrying an internal combustion engine $A^1$ and supported on three wheels B, $B^1$, $B^2$. One of these wheels B supports the side of the frame A adjacent to the unplowed land, the axle $B^3$ of this wheel being disposed approximately in the centre of the length of the frame A as shown and supported at its ends respectively by parts $A^2$ and $A^3$ of this frame.

The other two wheels $B^1$, $B^2$ support the side of the frame A adjacent to the plowed land and are each mounted upon a stub axle $B^4$ carried by the outer end of an arm $B^5$ which is connected at its inner end to the frame A by a vertical pivot $B^6$. The arms $B^5$ extend obliquely from the frame A as shown so that by swinging them about their pivots $B^6$, the wheels $B^1$, $B^2$ can be brought towards or moved away from the longitudinal axis of the frame A. A connection is provided between the arms $B^5$ whereby when one arm swings outwards the other arm swings inwards so as to alter the transverse positions of the wheels $B^1$, $B^2$ relatively to the frame in the manner according to this invention. The different positions into which the wheels $B^1$, $B^2$ can thus be moved respectively for plowing in one direction and the other are indicated in Figures 3 and 4. The connection between the arms $B^5$ comprises a lever C carried by each arm and connected by a link $C^1$ to a crank pin $C^2$ on a crank web $C^3$ which is common to both crank pins and is rigidly mounted on a shaft B extending across the frame. By rotating the shaft D through a partial turn by mechanism hereinafter described the crank pins $C^2$ act through the links $C^1$ and levers C on the pivoted arms $B^5$ to change the transverse positions of the wheels $B^1$, $B^2$ relatively to the frame A at the end of the travel of the plow in one direction in the manner according to this invention so as to act as set-over mechanism for causing the plow to move automatically into the correct position for plowing its next furrow as soon as it starts to travel in the return direction.

Two plowshares E facing in opposite directions are provided, these plowshares being carried by arms $E^1$ rigidly connected to a common hub member $E^2$ which is keyed to the end of the shaft D. Each arm $E^1$ also carries a knife coulter $E^3$ as shown. With this mechanism it will be seen that when one plowshare is raised the other is automatically lowered, a partial rotation of the shaft D to operate the set-over mechanism being simultaneously effected.

The axes of the wheels $B^1$, $B^2$ are maintained substantially at right angles to the direction of motion of the plow in spite of the movement of the arms $B^5$ by pivoting the stub axles $B^4$ to the arms $B^5$ as indicated at $B^7$ and providing each stub axle with a lever $B^8$ connected by a link $B^9$ to a quadrant $B^{10}$ which can be rocked about the axis of the pivot $B^6$ to which it is rigidly connected independently of the arm $B^5$.

The quadrants $B^{10}$ are operatively connected together by a linkage comprising a lever F pivoted at $F^1$ one end of which is connected by a link G to one adjacent quadrant $B^{10}$ while its other end is connected by a link $G^1$ to the other quadrant. Steering can be effected by means of either of two wheels H each mounted upon the upper end of a spindle $H^1$ the lower end of which carries a pinion $H^2$ meshing with a toothed quadrant $H^3$ rigidly connected to the quadrant $B^{10}$. The steering mechanism is however normally held from movement by fair leads $G^2$ rigidly connected respectively to the lower ends of the pivots $B^6$, the cable $H^4$ by means of which the plow draws itself over the land passing through these fair leads $G^2$ whereby the pull on the cable $H^4$ normally maintains the steering mechanism in correct position.

The anchored cable $H^4$, after passing through one of the fair leads $G^2$, passes under a guide pulley J supported on the frame, and thence over a V-type pulley $J^1$ from which it passes round a drum $J^2$ and thence over a second V-type pulley $J^1$ under a second guide pulley J and finally through the other fair lead $G^2$. A wheel $J^3$ carried on a lever $J^4$ pivoted at $J^5$ is conveniently provided adjacent to each V-pulley $J^1$, the wheel $J^3$ having a bevelled edge and serving to force the cable $H^4$ into the adjacent V-pulley $J^1$ by reason of a spring $J^6$ acting on the lever $J^4$.

The mechanism for causing rotation of the drum $J^2$ and pulleys $J^1$ may vary, but in the construction shown the pulleys $J^1$ are mounted upon spindles $J^7$ and are each operatively connected to the drum $J^2$ by a bevel wheel M carried by the pulley $J^1$ and meshing with a bevel wheel $M^1$ on one end of a shaft $M^2$ the other end of which carries a bevel wheel $M^3$ meshing with a bevel wheel $M^4$ on the drum $J^2$, the drum itself being freely mounted on the shaft D and driven from a lay shaft N through a chain $M^5$ engaging sprockets $N^1$ and $M^6$ respectively on the lay shaft N and drum $J^2$.

The arrangement of the V-pulleys $J^1$, guide pulleys J and drum $J^2$ and the associated driving mechanism is shown in general outline in Figures 1 and 2 while Figure 5 shows this apparatus in more detail.

Power is delivered to the lay shaft N by a chain $N^2$ extending between a sprocket $N^3$ on the lay shaft N and a sprocket $O^1$ on a second shaft O. The shaft O carries two clutches the driven member $O^2$ of each of which is rigidly connected to the shaft O by a key or the like while the two driving members $O^3$ which lie adjacent to one another carry bevel pinions $O^4$ both meshing with a common bevel pinion $P^1$ on the end of a shaft P which is operatively connected to the engine $A^1$. Thus, the bevel wheels $O^4$ and hence the driving members $O^3$ of the two clutches are driven in opposite directions whereby by engaging one or other of the clutches the shaft O and hence the lay shaft N can be driven in one direction or the other.

The mechanism for engaging and disengaging the clutches $O^2 O^3$ comprises two arms $O^5$ carried by a rod Q mounted to slide in fixed supports $Q^1$ so that when one clutch $O^2$ $O^3$ is engaged the other is simultaneously disengaged.

One of the arms $O^5$ is connected by a link $Q^2$ to one arm $Q^3$ of a bell crank lever pivoted at $Q^4$ the other arm of which engages a collar $R^1$ on a longitudinally movable rod R the operation of which will be hereinafter described.

The rod R is mounted to slide in fixed guides $R^2$ and carries a cross head $R^3$ provided with a slot $R^4$ in one face thereof and carrying a pin $R^5$ on its other face. The pin $R^5$ engages a slot $E^3$ in an arm $E^4$ rigidly connected to the member $E^2$ whereby when the rod R and cross head $R^3$ are moved longitudinally the member $E^2$ and hence the shaft D will be rocked to lift one plowshare and lower the other and also, through the crank $C^3$ and crank pins $C^2$, to operate the set-over mechanism.

The longitudinal movement of the rod R and cross head $R^3$ is effected in the following manner.

Engaging the slot $R^4$ in the cross head $R^3$ is a pin S carried by a plate $S^1$ rotatably mounted on the shaft $D^1$ whereby rotation of the plate will cause the cross head $R^3$ and rod R to move backwards and forwards and means are provided for causing the plate $S^1$ to execute a half revolution only each time the plow is to be reversed so as to move the cross head from one position to the other. This mechanism comprises a pawl $S^2$ mounted upon a pivot $S^3$ on the plate $S^1$ and acted upon by a spring $S^4$ tending always to move it into engagement with a ratchet wheel $S^5$. The ratchet wheel $S^5$ is rigidly connected to or formed integral with a constantly rotating gear wheel $S^6$ meshing with a gear wheel $S^7$ on a shaft $S^8$, which is driven from the shaft P through bevel gears $P^2$, $S^9$.

Thus, when the engine $A^1$ is in operation the ratchet wheel $S^5$ is in constant rotation and when the pawl $S^2$ engages with this ratchet wheel the plate $S^1$ will be carried round therewith. Mechanism is provided whereby the pawl $S^2$ is normally held out of engagement with the ratchet wheel $S^5$ and is only permitted to engage therewith when the direction of motion of the plow is to be reversed, the pawl $S^2$ then being permitted to engage the ratchet wheel $S^5$ until the plate $S^1$ has completed a half revolution therewith and the member $E^2$ has thus been partially rotated to raise one plowshare and lower the other, to operate the set-over mechanism and to release one of the clutches $O^2$ $O^3$ and engage the other, whereupon the pawl $S^2$ is automatically disengaged from the ratchet wheel $S^5$ and the plate $S^1$ thus ceases to move and remains stationary until the ratchet releasing mechanism is again operated.

This ratchet releasing mechanism comprises two plunger-like members T, $T^1$ mounted to slide in holes in a support $T^2$ and each connected at one end by a pin $T^3$ to a cross bar $T^4$ pivoted at $T^5$ and having slots $T^6$ which are engaged by the pins $T^3$ as shown. Thus when the member T is moved as shown in Figure 6 so as to lie in the path of the tail $S^{10}$ of the pawl $S^2$, the member $T^1$ is moved out of the path of this pawl and vice versa. The operation of the members T, $T^1$ is as follows:

Suppose the member T to be in the position as shown in Figure 6, in this position it engages the tail $S^{10}$ of the pawl $S^2$ and thus holds the pawl out of engagement with the ratchet wheel $S^5$. If now the cross bar $T^4$ is rocked to move the member T out of the path of the pawl $S^2$ and the member $T^1$ into its path, the pawl will be released and will engage the ratchet wheel $S^5$. The pawl $S^2$ and plate $S^1$ will thus be carried round with the pin S for half a revolution whereupon the tail $S^{10}$ of the pawl will engage with the member $T^1$ which is now in its operative position and the pawl will thus be moved out of engagement with the ratchet wheel $S^5$ and the plate $S^1$ will stop. Thus, by rocking the member $T^4$ from one position to the other the desired partial revolution of the plate $S^1$ to rock the member $E^2$ and thus operate the set-over mechanism, raise one plowshare and lower the other and disengage one clutch $O^2$ $O^3$ and engage the other is brought about.

The rocking of the member $T^4$ is effected by a lever U one arm of which is connected by a link $U^1$ to one end of the member $T^4$ while its other arm engages collars $U^2$ on a longitudinally movable rod $U^3$ extending substantially throughout the length of the frame A. Each end of the rod $U^3$ is connected to one arm of a bell crank lever $U^4$ the other arm of which is connected by a link $U^5$ to one end of a lever $U^6$. The other end of the lever $U^6$ engages a collar V mounted to slide on the lower end of the pivot $V^6$, the collar V also being engaged by one arm of a bell crank lever $V^1$ the other arm of which is acted upon by a trigger member $V^2$ mounted to slide on the tiller $G^2$ and having a part $V^3$ adapted to engage a stop on the cable $H^4$ when reversal of the plow is to be effected.

The general operation of the plow is briefly as follows:—

Supposing the plow to be travelling in one direction with the leading wheel in the furrow previously cut and the trailing wheel in the furrow actually being cut as shown in Figure 3, when it approaches the headland a stop on the anchored cable $H^4$ comes into contact with the member $V^3$ and moves the trigger member $V^2$ which, through the levers $V^1$, $U^6$, link $U^5$, lever $U^4$, rod $U^3$, lever U and link $U^1$, rocks the rocking arm $T^4$ so as to cause one of the members T, $T^1$ engaging the pawl $S^2$ to release it. The pawl thus engages the ratchet wheel $S^5$ and causes the plate $S^1$ to be carried round therewith for a half revolution whereupon the pawl $S^2$ comes into contact with the other of the members T, $T^1$ and is moved out of engagement with the ratchet wheel $S^5$ whereupon the plate $S^1$ stops. This half rotation of the plate $S^1$ acts through the pin S on the cross head $R^3$ to move it and the rod R longitudinally so as to raise one plowshare and lower the other and impart a partial rotation to the shaft D whereby the set-over mechanism is operated. At the same time the movement of the rod R acts through the lever $Q^5$, $Q^3$ and link $Q^2$ on the arm $O^5$ of the clutch-operating mechanism to disengage one clutch $O^2$, $O^3$ and engage the other and thereby reverse the direction of rotation of the drum $J^2$ and pulleys $J^1$ and hence the direction of travel of the plow.

For the purpose of ensuring that the trigger member $V^2$ and the mechanism whereby movement thereof is transmitted to the rocking arm $T^4$ shall be maintained in its correct position throughout the travel of the plow in one direction, a link W is provided connecting a point on the member $E^2$ to one end of a lever $W^1$ the other end of which engages a collar $W^2$ on the rod $U^3$. The collar $W^2$ is free to slide on the rod $U^3$ and is acted upon by one end of each of two springs $W^3$ the other ends of which act upon collars $W^4$ rigidly connected to the rod $U^3$. With this arrangement it will be seen that when the trigger mechanism $V^2$ is first operated one of the springs $W^3$ will be compressed and the other released but as soon as the member $E^2$ has been rocked as a result of the operation of the trigger mechanism, the link W will act through the lever W¹ to move the collar W² into the position as shown in Figure 1 in which both springs W³ are under equal compression and thus tend to maintain the rod U³ in position.

When the set-over mechanism has been operated and the plow reversed the new leading wheel B¹ remains in the furrow previously cut and the following wheel B² moves obliquely across the furrow previously cut and enters the new furrow actually being cut by the plowshare which has just been brought into operation in which furrow it then remains, the position then being as indicated in Figure 4.

It will be seen that the pressure on the operating plowshare acts to maintain it in its working position whereby the rod D and the whole set-over mechanism is rigidly held in position. Further the pull on the cable H⁴ acts through the fair leads G² on the pivot pin B⁶ to maintain the steering mechanism in correct alignment. After the plow has been reversed plowing continues in the same direction until a stop adjacent to the other end of the anchored cable H⁴ comes into contact with the other member V³ whereupon the operation as above described again takes place and the plow is again reversed.

With a plow as illustrated in the accompanying drawings the anchorages for the ends of the cable H⁴ are conveniently adapted to move automatically along anchoring cables or the like extending across the headlands. The automatic movement of these anchors is conveniently effected by the pull on the cable H⁴ when the plow commences its travel in either direction but this arrangement not forming any part of the present invention it is not considered necessary to illustrate it.

What I claim as my invention and desire to secure by Letters Patent is:—

1. A reversible power driven plow including in combination a frame, at least two oppositely disposed plowshares carried by the frame, means for bringing the shares into and out of their operative positions, at least one wheel supporting the side of the frame adjacent to the unplowed land, two movable supports on the side of the frame adjacent to the plowed land, deflectable stub axles carried by the supports, supporting wheels on the stub axles, set-over mechanism for bringing about relative movement in a direction transverse to the direction of travel of the plow between the frame and the two supports so that during travel of the plow in either direction the leading wheel can always run in a furrow cut on the previous traverse of the plow and the following wheel in a furrow actually being cut, an operative connection between the stub axles whereby they can only be deflected simultaneously, a cable whereby the plow is caused to travel across the land to be plowed, at least one fair lead through which the cable passes and an operative connection between each fair lead and the stub axles such that the pull on the cable acts on the fair lead to maintain the stub axles in the desired angular position during operation of the plow.

2. A reversible power driven plow including in combination a frame, at least two oppositely disposed plowshares carried by the frame, means for bringing the plowshares into and out of their operative positions, at least one wheel supporting the side of the frame adjacent to the unplowed land, an arm pivoted vertically at each end of the frame, a deflectable stub axle at the free end of each arm, a supporting wheel on each stub axle, an operative connection between the two arms whereby as one is moved towards the longitudinal axis of the frame the other is automatically moved away from such axis, means for moving the arms so that during travel of the plow in either direction the leading wheel can always run in a furrow cut on the previous traverse of the plow and the following wheel in a furrow actually being cut, an operative connection between the stub axles whereby they can only be deflected simultaneously, a cable whereby the plow is caused to travel across the land to be plowed, at least one fair lead through which the cable passes, and an operative connection between each fair lead and the stub axles such that the pull on the cable acts on the fair lead to maintain the stub axles in the desired angular position during operation of the plow independently of the position of the arms.

3. A reversible power driven plough including in combination a frame, at least two oppositely disposed plowshares carried by the frame, means for bringing the plowshares into and out of their operative positions, at least one wheel supporting the frame on the side adjacent to the unplowed land, two wheels supporting the side of the frame adjacent to the plowed land, set-over mechanism for bringing about relative movement in a direction transverse to the direction of travel of the plow between the frame and the two wheels supporting the side thereof adjacent to the plowed land so that during travel of the plow in either direction the leading wheel can always run in a furrow cut on the previous traverse of the plow and the following wheel in a furrow actually being cut, and an operative connection between the set-over mechanism and the share raising and lowering mechanism whereby when the set-over mechanism is operated at the end of the travel of the plow in one direction, the appropriate share is also automatically brought into operation and the other share moved into its inoperative position.

4. A reversible power driven plow including in combination a frame, at least two oppositely disposed plowshares carried by the frame, means for bringing the plowshares into and out of their operative positions, at least one wheel supporting the frame on the side adjacent to the unplowed land, two wheels supporting the side of the frame adjacent to the plowed land, set-over mechanism for bringing about relative movement in a direction transverse to the direction of travel of the plow between the frame and the two wheels supporting the side thereof adjacent to the plowed land so that during travel of the plow in either direction the leading wheel can always run in a furrow cut on the previous traverse of the plow and the following wheel in a furrow actually being cut, an operative connection between the set-over mechanism and the share raising and lowering mechanism whereby when the set-over mechanism is operated at the end of the travel of the plow in one direction the appropriate share is also automatically brought into operation and the other share moved into its inoperative position, and means for automatically operating the set-over and share raising and lowering mechanism when the plow is reversed.

5. A reversible power driven plow including in combination a frame, at least two oppositely disposed plowshares carried by the frame, means for bringing the plowshares into and out of their operative positions, at least one wheel supporting the frame on the side adjacent to the unplowed land, two movable supports on the side of the frame adjacent to the plowed land, deflectable stub axles carried by these supports, supporting wheels mounted on the stub axles, set-over mechanism for bringing about relative movement in a direction transverse to the direction of travel of the plow between the frame and the two supports so that during travel of the plow in either direction the leading wheel can always run in a furrow cut on the previous traverse of the plow and the following wheel in a furrow actually being cut, an operative connection between the stub axles whereby they can only be deflected simultaneously, means for normally maintaining the stub axles parallel to one another independently of the position of the set-over mechanism, and an operative connection between the set-over mechanism and share raising and lowering mechanism whereby when the set-over mechanism is operated at the end of the travel of the plow in one direction the appropriate share is also automatically brought into operation and the other share moved into its inoperative position.

6. A reversible power driven plow including in combination a frame, at least two oppositely disposed plowshares carried by the frame, means for bringing the plowshares into and out of their operative positions, at least one wheel supporting the frame on the side adjacent to the unplowed land, two movable supports on the side of the frame adjacent to the plowed land, deflectable stub axles carried by these supports, supporting wheels mounted on the stub axles, set-over mechanism for bringing about relative movement in a direction transverse to the direction of travel of the plow between the frame and the two supports so that during travel of the plow in either direction the leading wheel can always run in a furrow cut on the previous traverse of the plow and the following wheel in a furrow actually being cut, an operative connection between the stub axles whereby they can only be deflected simultaneously, means for normally maintaining the stub axles parallel to one another independently of the position of the set-over mechanism, an operative connection between the set-over mechanism and the share raising and lowering mechanism whereby when the set-over mechanism is operated at the end of the travel of the plow in one direction, the appropriate share is also brought into operation and the other share moved into its inoperative position, and means for automatically operating the set-over and share raising and lowering mechanism when the plow is reversed.

7. A reversible power driven plow including in combination a frame, at least two oppositely disposed plowshares carried by the frame, means for bringing the shares into and out of their operative positions, at least one wheel supporting the side of the frame adjacent to the unplowed land, two movable supports on the side of the frame adjacent to the plowed land, deflected stub axles carried by the supports, supporting wheels on the stub axles, set-over mechanism for bringing about relative movement in a direction transverse to the direction of travel of the plow between the frame and the two supports so that during travel of the plow in either direction the leading wheel can always run in a furrow cut on the previous traverse of the plow and the following wheel in a furrow actually being cut, an operative connection between the stub axles whereby they can only be deflected simultaneously, a cable whereby the plow is caused to travel across the land to be plowed, at least one fair lead through which the cable passes, an operative connection between each fair lead and the stub axles such that the pull on the cable acts on the fair lead to maintain the stub axles in the desired angular position during operation of the plow, and an operative connection between the set-over mechanism and the share raising and lowering mechanism whereby when the set-over mechanism is operated at the end of the travel of the plow in one direction the appropriate share is also automatically brought into operation and the other share moved into its inoperative position.

8. A reversible power driven plow including in combination a frame, at least two oppositely disposed plowshares carried by the frame, means for bringing the shares into and out of their operative positions, at least one wheel supporting the side of the frame adjacent to the unplowed land, two movable supports on the side of the frame adjacent to the plowed land, deflectable stub axles carried by the supports, supporting wheels on the stub axles, set-over mechanism for bringing about relative movement in a direction transverse to the direction of travel of the plow between the frame and the two supports so that during travel of the plow in either direction the leading wheel can always run in a furrow cut on the previous traverse of the plow and the following wheel in a furrow actually being cut, an operative connection between the stub axles whereby they can only be deflected simultaneously, a cable whereby the plow is caused to travel across the land to be plowed, at least one fair lead through which the cable passes, an operative connection between each fair lead and the stub axles such that the pull on the cable acts on the fair lead to maintain the stub axles in the desired angular position during operation of the plow, an operative connection between the set-over mechanism and the share raising and lowering mechanism whereby when the set-over mechanism is operated at the end of the travel of the plow in one direction the appropriate share is brought into operation and the other share is moved into its inoperative position, and means for automatically operating the set-over and the share raising and lowering mechanism when the plow is reversed.

9. A reversible power driven plow including in combination a frame, at least two oppositely disposed plowshares carried by the frame, means for bringing the plowshares into and out of their operative positions, at least one wheel supporting the frame on the side adjacent to the unplowed land, two wheels supporting the side of the frame adjacent to the plowed land, set-over mechanism for bringing about relative movement in a direction transverse to the direction of travel of the plow between the frame and the two wheels supporting the side thereof adjacent to the plowed land so that during travel of the plow in either direction the leading wheel can always run in a furrow cut on the previous traverse of the plow and and the following wheel in a furrow actually being cut, and an operative connection between the set-over mechanism and the share raising and lowering mechanism whereby when the set-over mechanism is operated at the end of the travel of the plow in one direction the appropriate share is also automatically brought into operation and the other share moved into its inoperative position, the arrangement being such that the thrust on the operative share during the operation of the plow acts to maintain the set-over and share raising and lowering mechanisms in their desired positions.

10. A reversible power driven plow including in combination a frame, at least two oppositely disposed plowshares carried by the frame, means for bringing the plowshares into and out of their operative positions, at least one wheel supporting the frame on the side adjacent to the unplowed land, two wheels supporting the side of the frame adjacent to the plowed land, set-over mechanism for bringing about relative movement in a direction transverse to the direction of travel of the plow between the frame and the two wheels supporting the side thereof adjacent to the plowed land so that during travel of the plough in either direction the leading wheel can always run in a furrow cut on the previous traverse of the plow and the following wheel in a furrow actually being cut, an operative connection between the set-over mechanism and the share raising and lowering mechanism whereby when the set-over mechanism is operated at the end of the travel of the plow in one direction the appropriate share is also automatically brought into operation and the other share moved into its inoperative position, and means for automatically operating the set-over and share raising and lowering mechanism when the plow is reversed, the arrangement being such that after the set-over and share raising and lowering mechanisms have been operated at the end of the travel of the plow in one direction and the plow begins to travel in the other direction the thrust then exerted on the operative share serves to maintain the set-over and share raising and lowering mechanisms in their desired positions.

11. A reversible power driven plow including in combination a frame, at least two oppositely disposed plowshares carried by the frame, means for bringing the plowshares into and out of their operative positions, at least one wheel supporting the frame on the side adjacent to the unplowed land, two wheels supporting the side of the frame adjacent to the plowed land, set-over mechanism for bringing about relative movement in a direction transverse to the direction of travel of the plow between the frame and the two wheels supporting the side thereof adjacent to the plowed land so that during travel of the plow in either direction the leading wheel can always run in a furrow cut on the previous traverse of the plow and the following wheel in a furrow actually being cut, an operative connection between the set-over mechanism and the share raising and lowering mechanism whereby when the set-over mechanism is operated at the end of the travel of the plow in one direction the appropriate share is also automatically brought into operation and the other share moved into its inoperative position, a prime mover mounted on the frame and mechanism whereby power derived from the prime mover can be caused to operate the set-over and share raising and lowering mechanism.

12. A reversible power driven plow including in combination a frame, at least two oppositely disposed plowshares carried by the frame, means for bringing the plowshares into and out of their operative positions, at least one wheel supporting the frame on the side adjacent to the unplowed land, two wheels supporting the side of the frame adjacent to the plowed land, set-over mechanism for bringing about relative movement in a direction transverse to the direction of travel of the plow between the frame and the two wheels supporting the side thereof adjacent to the plowed land so that during travel of the plow in either direction the leading wheel can always run in a furrow cut on the previous traverse of the plow and the following wheel in a furrow actually being cut, a prime mover mounted on the frame and mechanism whereby power derived from the prime mover can be caused to operate the set-over and share raising and lowering mechanism.

13. A reversible power driven plow including in combination a frame, at least two oppositely disposed plowshares carried by the frame, means for bringing the plowshares into and out of their operative positions, at least one wheel supporting the frame on the side adjacent to the unplowed land, two wheels supporting the side of the frame adjacent to the plowed land, set-over mechanism for bringing about relative movement in a direction transverse to the direction of travel of the plow between the frame and the two wheels supporting the side thereof adjacent to the plowed land so that during travel of the plow in either direction the leading wheel can always run in a furrow cut on the previous traverse of the plow and the following wheel in a furrow actually being cut, a prime mover mounted on the frame, reversible mechanism operated by the prime mover for drawing an anchored cable through the plow so as to cause the plow to travel in either direction, mechanism whereby power derived from the prime mover can be caused to operate the set-over and share raising and lowering mechanisms, and a member adapted to be acted upon and moved by a stop on the anchored cable when the plow is to be reversed and by its movement to cause operation of the set-over and share raising and lowering mechanisms and also to reverse the cable drawing mechanism.

14. A reversible power driven plow including in combination a frame, at least two oppositely disposed plowshares carried by the frame, means for bringing the plowshares into and out of their operative positions, at least one wheel supporting the frame on the side adjacent to the unplowed land, two wheels supporting the side of the frame adjacent to the plowed land, set-over mechanism for bringing about relative movement in a direction transverse to the direction of travel of the plow between the frame and the two wheels supporting the side thereof adjacent to the plowed land so that during ravel of the plow in either direction the leading wheel can always run in a furrow cut on the previous traverse of the plow and the following wheel in a furrow actually being cut, a prime mover mounted on the frame, reversible mechanism operated by the prime mover for drawing an anchored cable through the plow so as to cause the plow to travel in either direction, mechanism whereby power derived from the prime mover can be caused to operate the set-over and share raising and lowering mechanisms, a member adapted to be acted upon and moved by a stop on the anchored cable when the plow is to be reversed and by its movement to cause operation of the set-over and share raising and lowering mechanisms, and means whereby the movement of the set-over mechanism serves to reverse the cable drawing mechanism.

In testimony whereof I have signed my name to this specification.

ARTHUR FORD.